March 1, 1966 M. WIDMER ETAL 3,237,487
DRILLING MACHINE, ESPECIALLY FOR DRILLING TURBINE HOUSINGS
Original Filed Aug. 10, 1959 2 Sheets-Sheet 1
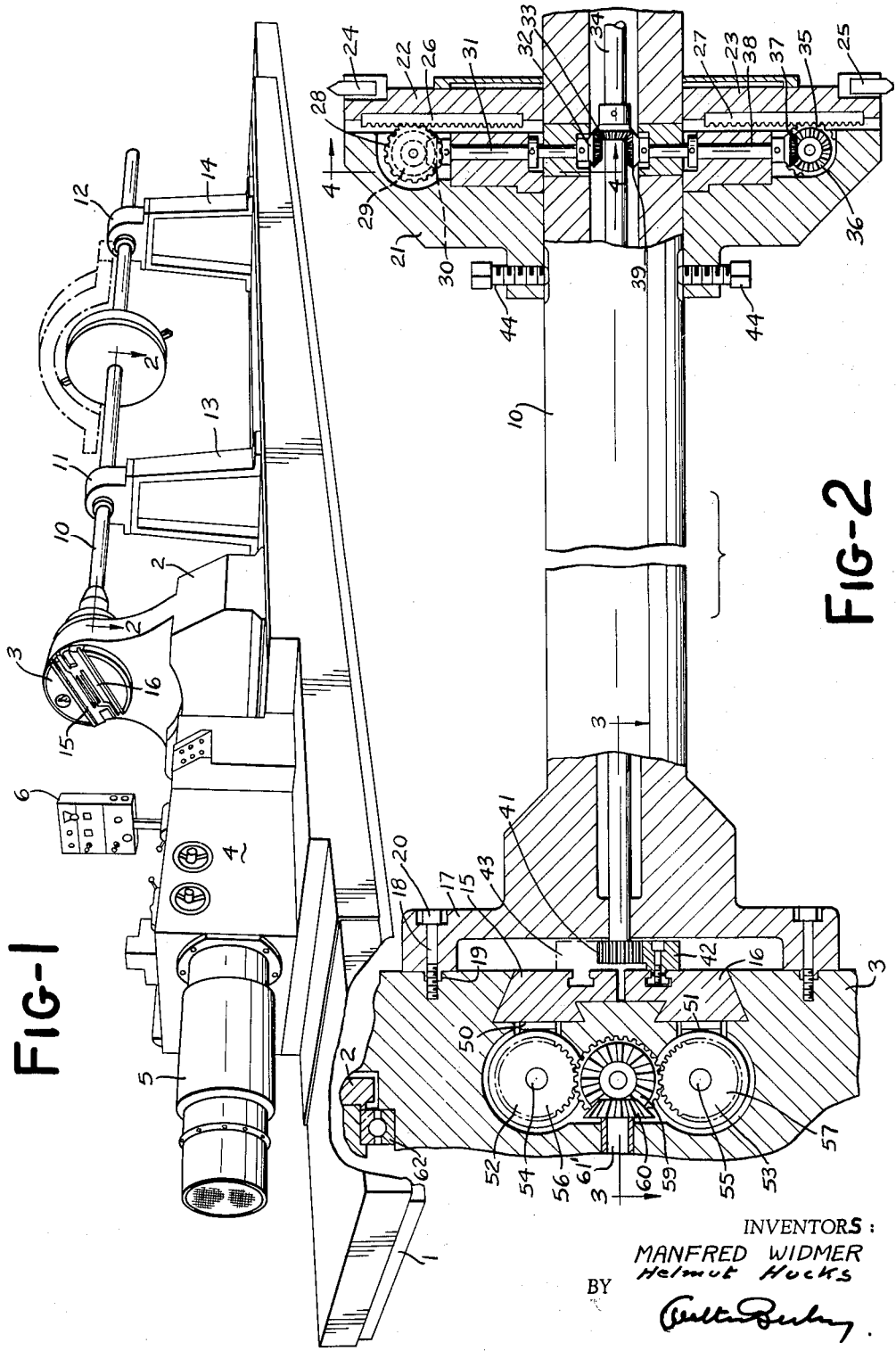
INVENTORS:
MANFRED WIDMER
Helmut Hucks
BY March 1, 1966 M. WIDMER ETAL 3,237,487
DRILLING MACHINE, ESPECIALLY FOR DRILLING TURBINE HOUSINGS
Original Filed Aug. 10, 1959 2 Sheets-Sheet 2

INVENTOR.
MANFRED WIDMER
BY Helmut Hucks

United States Patent Office 3,237,487
Patented Mar. 1, 1966

3,237,487
DRILLING MACHINE, ESPECIALLY FOR
DRILLING TURBINE HOUSINGS
Manfred Widmer, Zurich, Switzerland, and Helmut Hucks,
Monchen-Gladbach, Germany, assignors to Maschinenfabrik Froriep G.m.b.H., Rheydt, Rhineland, Germany
Original application Aug. 10, 1959, Ser. No. 832,746, now
Patent No. 3,103,135, dated Sept. 10, 1963. Divided
and this application Apr. 2, 1963, Ser. No. 270,030
Claims priority, application Germany, Aug. 12, 1958,
M 38,599; Oct. 18, 1958, M 39,337
11 Claims. (Cl. 77—3)

The present invention relates to a drilling or boring machine and one which is particularly adapted for drilling turbine housings and the like. The present application is a division of my co-pending application Ser. No. 832,746, filed August 10,, 1959, and entitled, "Drilling Machine, Especially for Drilling Turbine Housings," now Patent No. 3,103,135.

In my prior application, above referred to, there is shown a novel machine tool in which there is a rotary tool support which has moveable tool slides on its opposite faces for carrying cutting tools. The tool slides on each face are connected for movement in respectively opposite directions so that the tool slides on each face can be adjusted outwardly or inwardly thereon thereby to increase or decrease the radius on which the tools will cut. This machine and this type of tool support have proved to be particularly well adapted for machining turbine housings and the like wherein the element being turned or machined has a semi-circular surface to be cut. However, when cylindrical holes are to be drilled the arrangement referred to has the drawback that it cannot be inserted into a cylindrical hole except to a short distance.

Still further, certain work members are extremely long and it is not always possible to effect complete machining thereof except with considerable difficulty on account of the problem of gaining access to the areas being machined.

In my prior application I illustrate an arrangement whereby a boring bar can be attached to the aforementioned rotary tool support and be actuated thereby and in this manner cylindrical holes can be machined or semi-cylindrical surfaces can be machined which would otherwise be machined only with great difficulty with the rotary tool support or could not be machined at all.

With the foregoing in mind it will be appreciated that an object of the present invention is to provide an improved drilling or boring machine especially for turbine housings and the like.

A still further object of the present invention is the provision of a drilling machine of the aforementioned type which will have an increased working range.

A still further object of this invention is the provision of a specialized boring bar for being associated with a rotary tool support head in which the adjustment of the tool carrying slides on the work support head adjusts corresponding tool support heads on the boring head.

The foregoing objects as well as still other objectives and advantages of the present invention will become more apparent upon reference to the following specification taken in connection with the accompanying drawings, in which:

FIGURE 1 is a perspective view of a drilling machine according to the present invention equipped with a boring tool or boring bar according to the present invention.

FIGURE 2 is a sectional view indicated by line 2—2 on FIGURE 1 showing a portion of the rotary support head and a portion of the boring bar or boring tool in cross-section and, FIGURE 3 is a somewhat diagrammatic sectional view through the rotary tool support head of the machine and is indicated by line 3—3 on FIGURE 2.

Figure 3:
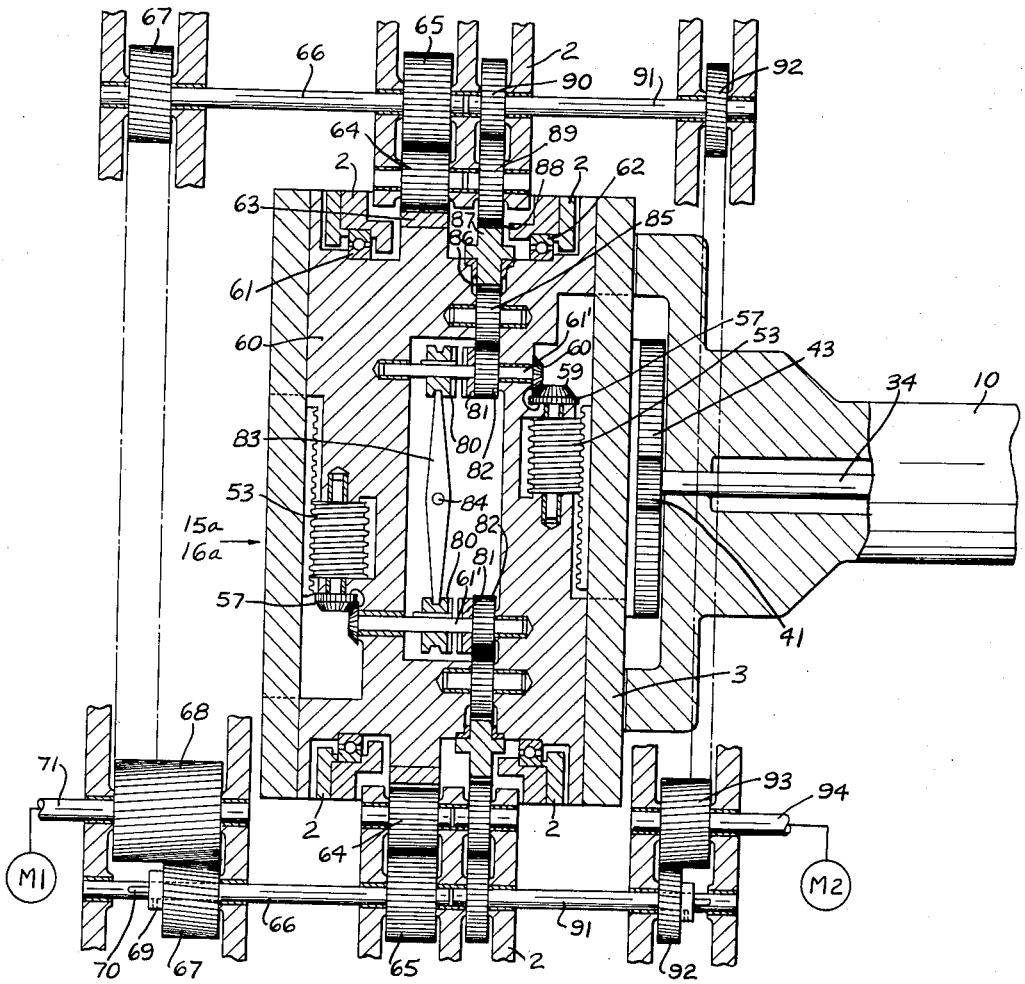
Figure 4:
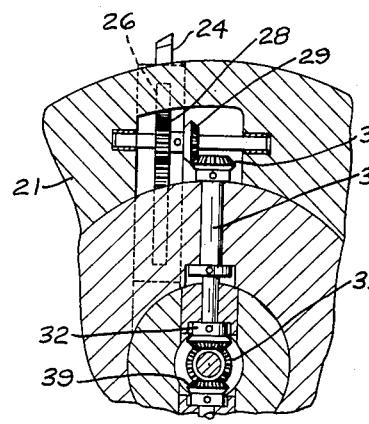
FIGURE 4 is a section on line 4—4 on FIGURE 2.

Referring to the drawings somewhat more in detail, the machine as somewhat generally shown in FIGURE 1 comprises a bed 1 and slidably mounted thereon is a bed slide 2 that carries a rotatable tool support head 3. The rotary tool support 3 is driven in any suitable manner through a transmission 4 from motor means generally indicated at 5. These motor means also include motor means for adjusting tool slides that are carried by the rotary tool support. A motor means is also provided for reciprocating bed slide 2 on bed 1 for obtaining feed movement of the rotary tool support. A control panel 6 is provided by means of which the movement of the rotary tool support can be controlled.

The work pieces to be operated are carried on support plates, not shown in the drawing, but which fixedly support the work pieces in suitable position for being machined by tools carried by the rotary tool support 3. The feed movement of bed slide 2 along the bed accomplishes the feeding of the tools relative to the work members being operated thereby.

According to the present invention, the rotary tool support 3 has fixed to one side thereof a boring bar 10 which extends through the spaced bearings 11 and 12 that are carried on the supports 13 and 14, respectively. The supports 13 and 14 can be fixedly mounted on the bed and, in which case, the boring bar 10 is slidable through the bearings 11 and 12 so that they operate somewhat in the manner of steady rests. Alternatively, the supports 13 and 14 can be mounted to move with bed slide 2 in which case it is not necessary for boring bar 10 to reciprocate in the bearings.

Still further, while two of the supports 13 and 14 and two bearings 11 and 12 have been illustrated, it will be evident that if the boring bar is to be used for boring cylindrical holes, the outboard 12 and its support member 12 could be eliminated and the boring bar could then enter the cylindrical hole to be bored in the axial direction. Alternatively, the member to be bored could be mounted between the supports 13 and 14 and the boring head advanced therethrough and with this arrangement a cylindrical bore could also be made. The boring bar is, of course, also useful for machining out semi-cylindrical members as is the case with the rotary tool support 3 and the provision of the boring bar will greatly extend the range of the machine and permit surfaces to be machined that otherwise could not be reached by the rotary support 3.

Each face of the rotary support 3 carries a pair of tool slides 15 and 16 and these tool slides are interconnected to move in respectively opposite directions so that they can be adjusted radially outwardly on the rotary tool support or radially inwardly thereon in unison so that a tool in each tool slide will do a portion of the machining. The tool slides are coplanar and the tools mounted therein are substantially coplanar and in this manner rapid machining can be had.

The manner in which the boring bar is associated with the rotary support 3 is indicated in FIGURE 2 wherein it will be seen that the end of the boring bar adjacent the rotary support 3 is provided with flange means 17 on which is a tongue 18 extending into an annular groove 19 provided in the face of the rotary tool support 3. Cap screws 20 extending through the flange and threaded into the body of the rotary tool support fixedly connect the boring bar to the rotary tool support and prevent relative circumferential movement between the boring bar and the rotary tool support. The tongue and groove means provide for perfect alignment of the boring bar on the rotary tool support so that it is quite a simple matter to mount the boring bar on the tool support and to remove it therefrom.

The boring bar, at a point spaced from the rotary tool support has its own tool support head 21 and this tool support head has radially moveable slides 22 and 23. These slides carry the cutting tools 24 and 25, respectively, of any suitable and well known nature.

Slide 22 has on the back a rack 26 and slide 23 has on the back a similar rack 27. Rack 26 is engaged by a gear 28 to which is fixed a bevel gear 29 that meshes with a bevel gear 30 on shaft 31 rotatable in head 21 and extending radially inwardly to the region of the center of the boring bar where it carries another bevel gear 32 meshing with a center bevel gear 33 fixed to a center shaft 34 in the boring bar.

Similarly, rack 27 meshes with a gear 35 to which is fixed a bevel gear 36 meshing with a bevel gear 37 on shaft 38 that extends radially in body 21 toward the center of the boring bar and has fixed to its inner end a bevel gear 39 also meshing with bevel gear 33 on shaft 34.

The boring bar 10 is provided with an axial bore 40 through which shaft 34 extends to the region of the face of rotary support 3 to which the boring bar is attached. At the end of shaft 34 adjacent rotary tool support 3 the shaft has fixed thereto a gear 41 and meshing with this gear is a rack 42 mounted on tool slide 16. A similar rack could be provided on the other tool slide as indicated by the dot-dash outline 43 if so provided but, in general, a single drive rack meshing with gear 41 is sufficient.

It will be evident, from the foregoing description, that movement of slide 16 of rotary tool support 3 will bring about rotation of gear 41 and shaft 34 thereby to rotate bevel gear 33 which will, in turn, rotate bevel gears 32 and 39 and drive through their respective shafts and other gears to racks 26 and 27 and cause radial movement of tool slides 22 and 23 on the boring bar head 21. The gearing is arranged so that the tool slides move outwardly and inwardly simultaneously so that the tools 24 and 25 will always be cutting on the same radius.

The boring head 21 is fixed drivingly to boring bar 10 and this may be accomplished by the clamp screws 44 which will transmit torque from the boring bar to the boring bar head and will also provide axial thrust on the boring bar head when it is moved in feed direction relative to a work piece being machined.

The driving of the tool slides 15 and 16 is accomplished by racks 50 and 51, respectively, secured to the backs thereof. These racks mesh with worms 52 and 53 respectively, which are fixed to the shafts 54 and 55, respectively. These shafts also have fixed thereto spur gears 56 and 57, respectively, which mesh with a spur gear therebetween that is drivingly connected with a bevel gear 59 that meshes with another bevel gear 60 on a shaft 61. The arrangement of the worms and racks pertaining to slides 15 and 16 is such that the slides move in respectively opposite directions so that cutting tools carried thereby will always be adjusted to cut on the same radius.

Turning now to FIGURE 3, the driving of the rotary tool support 3 and the mechanism for adjusting the tool slides thereon will be more clearly seen. In FIGURE 3 only one tool slide is shown on each face of the rotary tool slide so it will be understood that there are two slides side by side on each face with each slide being arranged to move in a direction respectively opposite to the direction that the adjacent slide moves.

In FIGURE 3, the body of the rotary tool support is indicated by reference numeral 60 and this body is rotatably supported by bearings 61 and 62 in the stationary slide 2, only portions of which are illustrated in FIGURE 3 but which portions are identified by reference numeral 2.

The body 60 of the rotary tool support has a gear formed on the periphery thereof at 63 and this gear is engaged by a pair of pinions 64. Each gear 64 meshes with a gear 65 on a shaft 66. The shafts 66 each carry a skew gear 67 and these skew gears are arranged for meshing with a driving skew gear 68. At least one of skew gears 67 is axially adjustable on its pertaining shaft, the lower one as the arrangement is illustrated in FIGURE 3, and because of this axial adjustability of one of the skew gears 67, all lost motion between driving skew gears 68 and the tool support body can be eliminated and thus a play-free drive arrangement is provided for. Gear 67 is adapted for being fixed on its supporting shaft as by the collar 69 and is keyed thereto by feather key 70.

The skew gear 68 is mounted on a shaft 71 which is drivingly connected with a motor means M1 which may consist of a single motor or plural motors so as to provide for a single drive speed or for multiple drive speeds of the rotary tool support. Preferably, multiple speeds are provided so that both high speed and slow speed turning operations can be carried out.

A drive arrangement is also provided for driving the spaced slides on the rotary tool support 3.

The arrangement for driving the spaced slides on opposite sides of the rotary tool support 3 is also illustrated in FIGURE 3. The figure shows only one face slide on each side of the tool support but it will be understood that there are two thereof as illustrated in FIGURES 1 and 2.

The aforementioned shaft 61 which is rotatable for adjusting slides 50 and 60 in respectively opposite directions has its counterpart in shaft 61a which is associated with the face slides 15a and 16a on the other side of the body 60 of the rotary tool support 3. Each of these shafts 61, 61a has keyed thereto a clutch member 80 which is normally disengaged from its corresponding clutch part 81 and which latter mentioned clutch part is affixed to or is a part of a gear 82 rotatable on the respective shaft 61, 61a. A lever 83 interconnects the clutch members 80 and is moveable for engaging either one of the clutch members with its pertaining clutch part 81 or for disengaging both of the clutch members. The lever is pivoted intermediate at the end at 84 and this may take the form of the actuating shaft which moves the lever between its aforementioned three operative positions.

Each gear 82 meshes with a gear 85 rotatably mounted in the body 60 of the rotary tool support and gears 85 mesh with the internal gear portion 86 of a ring 87 that is rotatable on body 60. Ring 87 also has an external gear portion 88 formed thereon which meshes with the gears 89 which are rotatable in the body of slide 2. Gears 89 mesh with gears 90 that are mounted on shafts 91 that are rotatable in the body of bed slide 2. Shafts 90 carry the skew gears 92, and one thereof is axially adjustable on its pertaining shaft in the same manner as the aforementioned skew gear 67 in order to take up all play between a driving skew gear 93 with which skew gears 92 mesh and the aforementioned slide adjusting mechanism.

Skew gear 93 is mounted on a shaft 94 that is connected with a driving means such as the reversible motor M2. By the reversible driving means the skew gear 93 can be driven in either direction and this, in turn, will drive the gears 82 in either direction so either of shafts 61 or 61a can be driven in either direction so that either set of slides on the two faces of body 60 of the rotary tool support 3 can be adjusted either inwardly or outwardly at will. In connection with the adjustment of the tool slides on the boring bar, of course, the adjustment of the slides on the right hand face of the rotary tool support are the pertaining ones but when the machine is operating without the boring bar, it is usually the case that the slides on both faces thereof are to be adjusted.

While the present invention has been illustrated with the bore bar mounted on one side only of the rotatable support head, it will be appreciated that the bore bar could be mounted on either side of the rotatable support head and that, further, bore bars could be mounted on both sides of the rotary support if so desired. Each of the bore bars, at the rotary support end is provided with relief means so that the face slides of the rotary support head can move inwardly and outwardly without being obstructed by the base or mounting end of the bar attached to that particular side of the support head. Accordingly, either one bore bar or two bore bars could be employed at one time and also, at the same time, the tool slides carried by the rotary support head could also be made effective. It will therefore be apparent that it is not always necessary to remove the bore bars when it is desired to employ the rotary support head and that all of the several tool supporting face slides could be used individually or in unison, depending on the particular job to be done.

It will also be noted in the drawings that the face slides carried by the rotatable support are provided with key slots in which the racks for actuating the shafts extending axially through the bore bar can be mounted. These racks can be mounted in the respective key slots in any suitable well known manner and can be adjusted therein so that any desired preliminary positioning of the tool carrying face slides on the bore head can be effected.

It will be understood that this invention is susceptible to modification in order to adapt it to different usages and conditions and accordingly it is desired to comprehend such modifications within this invention as may fall within the scope of the appended claims.

What is claimed is:

1. A drilling machine comprising; a rotatable support, a bore bar detachably connected to said support and extending axially therefrom, a first tool slide on the support and a second tool slide on the bore bar remote from the rotatable support, means carried at least in part by said support, for moving the first tool slide thereon inwardly and outwardly, and means carried at least in part by the bore bar drivingly interconnecting said tool slides for movement thereof in unison.

2. A drilling machine comprising; a rotatable support, a bore bar detachably connected to said support and extending axially therefrom, a first tool slide on the support and a second tool slide on the bore bar remote from the rotatable support, means carried at least in part by said support for moving the first tool slide thereon inwardly and outwardly, and means carried at least in part by the bore bar drivingly interconnecting said tool slides for movement thereof in unison, the detachable connection of the bore bar to the support comprising bolt means extending through the bore bar into the support, and key means keying the bore bar to the support to fix the position of the bore bar relative to the support.

3. A drilling machine comprising: a rotatable support, a bore bar mounted on the axis of rotation of said support and detachably connected to the support, first tool slide means on the support, second tool slide means on the bore bar remote from the said support, means carried by said support for moving the slide means thereon selectively inwardly and outwardly relative to the axis of rotation of said support, means carried by the bore bar for selectively moving the tool slide means thereon inwardly and outwardly relative to the axis of rotation of the bore bar, and means drivingly connecting said last mentioned means with the tool slide means on said rotatable support.

4. A drilling machine comprising: a rotatable support, a bore bar mounted on the axis of rotation of said support and detachably connected to the support, first tool slide means on the support, second tool slide means on the bore bar remote from the said support, means carried by said support for moving the slide means thereon selectively inwardly and outwardly relative to the axis of rotation of said support, means carried by the bore bar for selectively moving the tool slide means thereon inwardly and outwardly relative to the axis of rotation of the bore bar, and means drivingly connecting said last mentioned means with the tool slide means on said rotatable support, said bore bar being outwardly flanged at said support end, screw threaded means clamping the outwardly flanged portion of the bore bar to the support means, an annular groove in one of said rotatable support and said bore bar, and arcuate key means carried by the other of said support and bore bar engaging said groove means whereby fixedly to locate the bore bar relative to the said support.

5. A drilling machine comprising; a rotatable support, a bore bar mounted on the axis of rotation of said support and detachably connected to the support, first tool slide means on the support, second tool slide means on the bore bar remote from the said support, means carried by said support for moving the slide means thereon selectively inwardly and outwardly relative to the axis of rotation of said support, means carried by the bore bar for selectively moving the tool slide means thereon inwardly and outwardly relative to the axis of rotation of the bore bar, and means drivingly connecting said last mentioned means with the tool slide means on said rotatable support, said bore bar being outwardly flanged at said support end, screw threaded means clamping the outwardly flanged portion of the bore bar to the support means, an annular groove in one of said rotatable support and said bore bar, and arcuate key means carried by the other of said support and bore bar engaging said groove means whereby fixedly to locate the bore bar relative to the said support, spaced support means for receiving said bore bar, and bearing means in said support means rotatably supporting said bore bar on the axis of rotation of said rotatable support.

6. A drilling machine comprising: a rotatable support, a pair of face slides mounted on at least one side of said support, the face slides of said pair of face slides being displaceable in respectively opposite directions with regard to each other, adjusting means operatively connected to said face slides for displacing the slides, means supporting and journalling said rotatable support at the periphery thereof, a bore bar mounted on the said one side of said support and extending axially therefrom co-axially therewith, a head on the end of said bore bar remote from said support, a second pair of face slides on said head displaceable in respectively opposite directions with regard to each other, adjusting means carried by the bore bar and operatively connected with the said face slides thereon for displacing the slides on the bore bar, and means drivingly connecting said last mentioned means with at least one of the face slides of said rotatable support whereby the adjusting means pertaining to the face slides on said rotatable support is operative for adjusting the face slides on the head of said bore bar.

7. In a drilling machine: a rotatable support, a pair of face slides mounted on one side of said support and being displaceable thereon in respectively opposite directions with regard to each other, adjusting means operatively connected to said pair of face slides for displacing the same, a bore bar mounted co-axially with said rotatable support and detachably clamped to the said one side thereof, a head on said bore bar remote from said rotatable support, a second pair of face slides carried by said head and displaceable thereon in respectively opposite directions with regard to each other, drive means carried by the head of the bore bar interconnecting said second pair of slides for effecting the said displacement thereof, a shaft extending along the axis of said bore bar and connected with said drive means for actuating the same, a pinion on said shaft at the end thereof adjacent said rotatable support, and rack means carried by at least one of the face slides on said rotatable support meshing with said pinion whereby adjustment of the face slides on said support will be accompanied by adjustment of the face slides on said bore bar.

8. In a drilling machine for turbine housings and similar structures: a rotatable support, two pairs of face slides respectively mounted on opposite sides of said support, the face slides of each of said pairs being displaceable in opposite directions with regard to each other, and adjusting means operatively connected to said pairs of face slides for displacing the slides including clutch means operable to clutch said adjusting means to one of said pairs only at a time, said support being journalled and driven at its periphery, a bore bar detachably mounted on at least one side of said support, said bore bar having a head remote from said support, bore bar face slides on said head displaceable thereon in respectively opposite directions with regard to each other, and drive means for said bore bar face slides extending through the said bore bar and operatively connected with the face slides of the support on the respective side of the said support whereby adjustment of the last mentioned face slides of the support will be accompanied by adjustment of the face slides on the bore bar.

9. In a drilling machine for turbine housings and similar structures: a rotatable support, two pairs of face slides respectively mounted on opposite sides of said support, the face slides of each of said pairs being displaceable in opposite directions with regard to each other, a bore bar connected to said support on one side thereof and provided with a bore head for receiving radially moveable boring tools, means for effecting a longitudinal feeding movement of said bore bar, and means extending through said bore bar for connecting said boring tools with the face slides on said one side of said support.

10. In a drilling machine for turbine housings and similar structures: a rotatable support, two pairs of face slides respectively mounted on opposite sides of said support, the face slides of each of said pairs being displaceable in opposite directions with regard to each other, a bore bar connected to said support and provided with a bore head for receiving boring tools, said bore bar having a longitudinal passage therein, said bore head being provided with radially movable slides for receiving and supporting boring tools, and driving means extending through said longitudinal passage and drivingly interconnecting said radially movable slides with at least one of said face slides.

11. A bore bar adapted for mounting on a rotatable support, said support having radially movable tool slides which comprises; a head on the bore bar remote from the end thereof adapted for connection with said rotatable support, tool slides radially moveable on said bore bar head, drive means interconnecting the tool slides on the bore bar head for movement in respectively opposite directions thereon, and a shaft connected to said drive means and extending through the bore bar to the end opposite the head and adapted for connection with at least one of the face slides on the support for adjustment of the bore bar slides in conformity with adjustment of the face slide on the said support.

References Cited by the Examiner
UNITED STATES PATENTS

| | | | |
|---|---|---|---|
| 1,424,489 | 8/1922 | Kriesel | 77—3 |
| 2,796,247 | 6/1957 | Sloane. | |

WILLIAM W. DYER, JR., *Primary Examiner.*